United States Patent
Schimke

[19]

[11] Patent Number: 6,102,132
[45] Date of Patent: Aug. 15, 2000

[54] FARM LAND COULTER ASSEMBLY

[76] Inventor: Harvey W. Schimke, R.R. 4, Red Deer, Alberta, Canada, T4N 5E4

[21] Appl. No.: 09/126,848

[22] Filed: Jul. 31, 1998

Related U.S. Application Data

[60] Provisional application No. 60/056,339, Aug. 18, 1997.
[51] Int. Cl.$^7$ ...................................................... A01C 5/00
[52] U.S. Cl. ........................ 172/498; 172/705; 111/139; 111/169
[58] Field of Search ...................... 172/165, 498, 172/705, 707, 710, 711, 776, 734, 739; 111/139, 14, 140, 192, 926, 121, 927, 157, 163, 168, 169, 84

[56] References Cited

U.S. PATENT DOCUMENTS

| | | | |
|---|---|---|---|
| 5,279,236 | 1/1994 | Truax | 111/139 |
| 5,573,072 | 11/1996 | Evans et al. | 172/744 |
| 5,657,707 | 8/1997 | Dresher et al. | 111/139 |
| 5,826,524 | 10/1998 | Yoder | 111/194 |

OTHER PUBLICATIONS

Brochure, K–Hart Industries, Elrose, SK, S0I 0Z0 Canada—p. 52—K–Hart Coulter Assemblies, (no date).
Farm Equipment Guide, Jan. 1998, p. 11.
Thurston, U.S. Parts Catalogue, p. 17—Coulter Replacement Parts, (no date).
DMI or Blue Jet, U.S. Parts Catalogue, p. 5—20" & 24 Colter Assemblies, (no date).

*Primary Examiner*—Robert E. Pezzuto
*Attorney, Agent, or Firm*—Bennett Jones LLP

[57] ABSTRACT

A coulter mounting assembly includes a torsion tube that absorbs upward movement of the coulter while maintaining downward force on the coulter. The torsion tube is mounted on a support beam which depends from a farm implement. A lever arm attaches to the torsion tube and supports a strut which allows the coulter to swivel about a vertical axis. The coulter rotatably attaches to an arm which is attached to the strut.

6 Claims, 4 Drawing Sheets

FARM LAND COULTER ASSEMBLY

This application is a continuation-in-part of Provisional Application 60/056,339, filed Aug. 18, 1997.

FIELD OF THE INVENTION

The present invention relates to a mounting assembly for a ground-breaking coulter.

BACKGROUND OF THE INVENTION

Coulters are disc-like implements which are mounted in multiple sets on farm implements such as cultivators or air seeders to break the ground for seeding or other agricultural operations. A typical implement may have 40 individual coulters arrayed laterally so that a wide swath of land may be seeded with one pass of a tractor. The weight of the implement provides downward force on the coulters so that the coulters effectively open up the ground.

However, because the coulters may encounter uneven terrain, or buried rocks or other obstacles, it is desirable to allow some flexibility in each individual coulter mounting assembly so that individual coulters may ride over obstacles and follow the contour of uneven terrain. This flexibility must be countered with a means for maintaining the downward force. In conventional coulter assemblies, a coulter is mounted on an arm which rotates about an axle or sleeve. A coil spring is used to urge the coulter downwards but permits the coulter to move upwards when necessary.

Conventional spring mounted coulters suffer from numerous disadvantages. There are many moving parts which have a tendency to wear and require replacement. Also, the spring tends to be mounted in a position where it snags surface debris which can impair performance. Therefore, there is a need in the art for a flexible coulter mounting assembly which avoids the drawbacks associated with the prior art.

SUMMARY OF THE INVENTION

In general terms, the present invention provides a coulter mounting assembly for mounting a coulter to an implement. The assembly comprises:

(a) a torsion tube comprising a torsion rod wherein said torsion tube is rigidly attached to the implement;

(b) a strut rigidly attached to and depending downwardly from the torsion rod; and (c) means for rotatably attaching a coulter wheel to the strut;

wherein the combination of the strut and wheel attachment means may rotate about an axis defined by the torsion rod and which rotational movement is resisted by the torsion tube and wherein said wheel attachment means may rotate about an axis defined by the longitudinal axis of the strut while the implement is in operation such that the directional orientation of the coulter changes upon such rotation.

wherein the combination of the strut, arm and wheel attachment means may rotate about an axis defined by the torsion means and which rotational movement is resisted by the torsion means.

In the preferred embodiment, the torsion tube comprises commercially available torsion tubes which comprise a casing, a torsion rod and an elastic material within the casing which biases the torsion rod to a pre-determined position.

BRIEF DESCRIPTION OF THE DRAWINGS

The invention will now be described by way of an exemplary embodiment with reference to the accompanying simplified, diagrammatic, out-of-scale drawings. In the drawings.

DETAILED DESCRIPTION OF THE INVENTION

Figure 1:
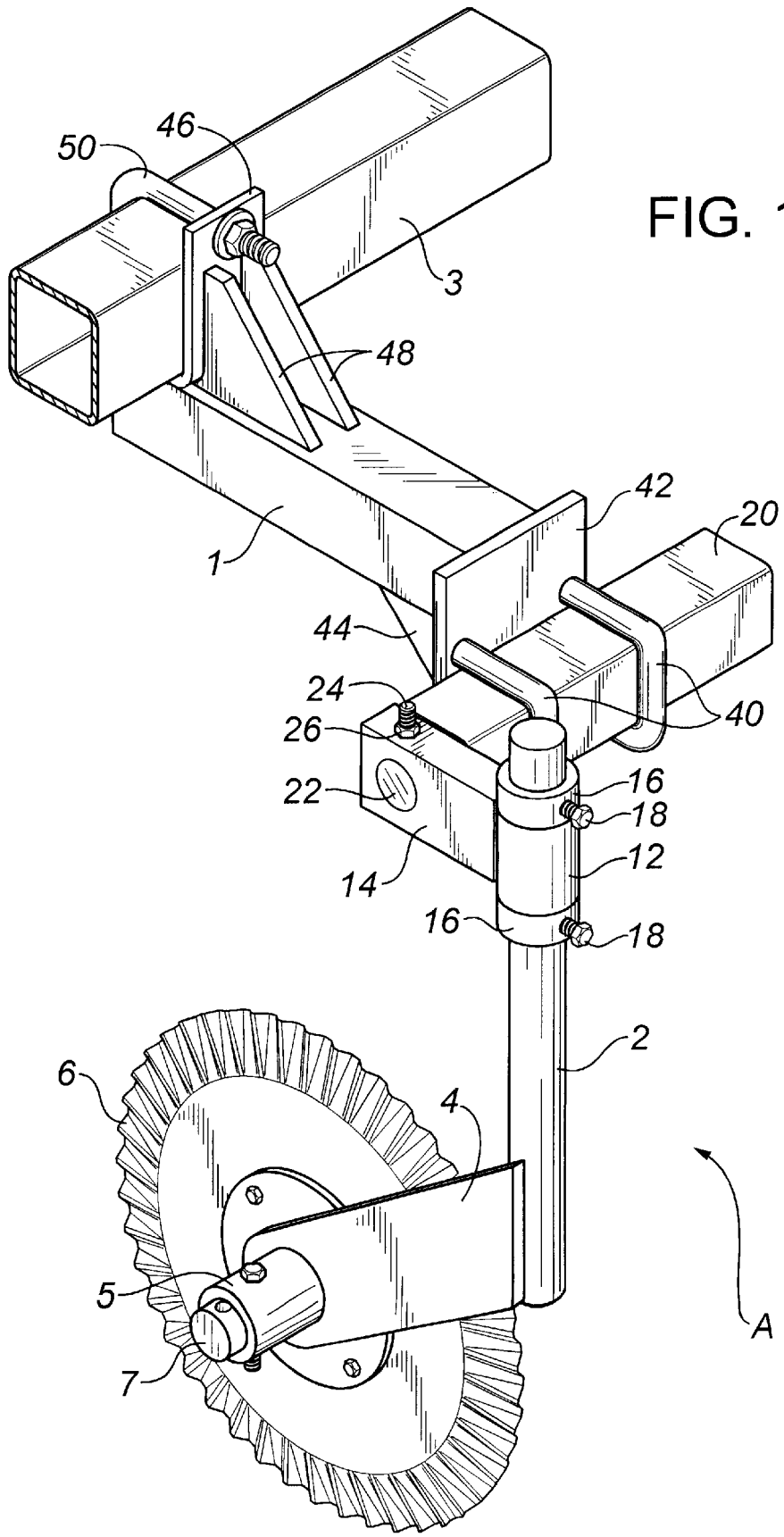
FIG. 1 is a coulter mounting assembly according to the present invention.
Figure 2:
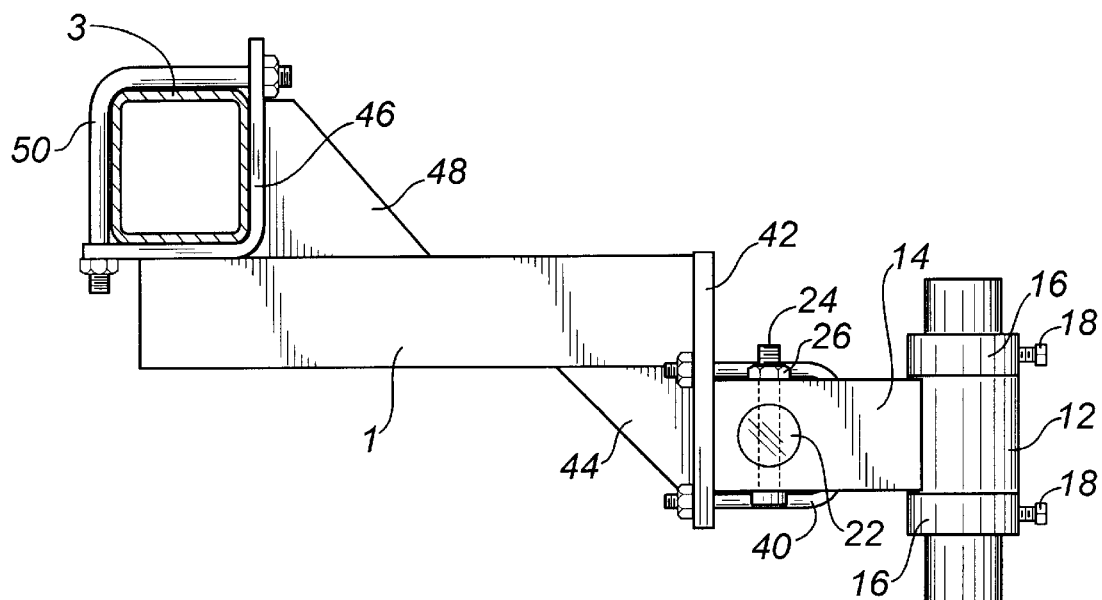
FIG. 2 is a side elevational view of the assembly shown in FIG. 1.
Figure 2:
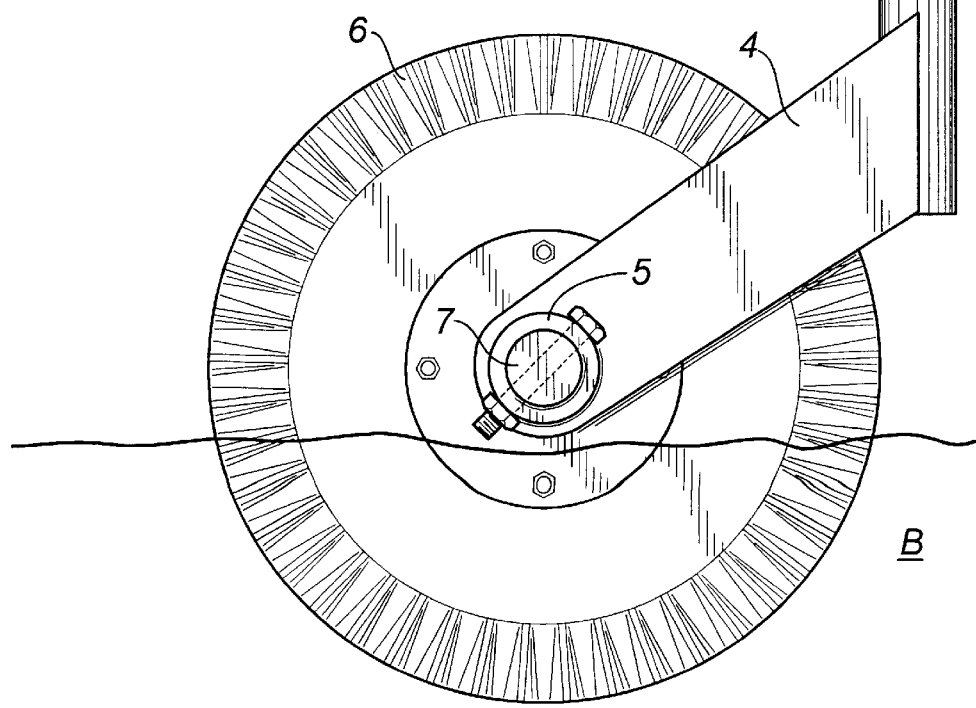
Figure 3:
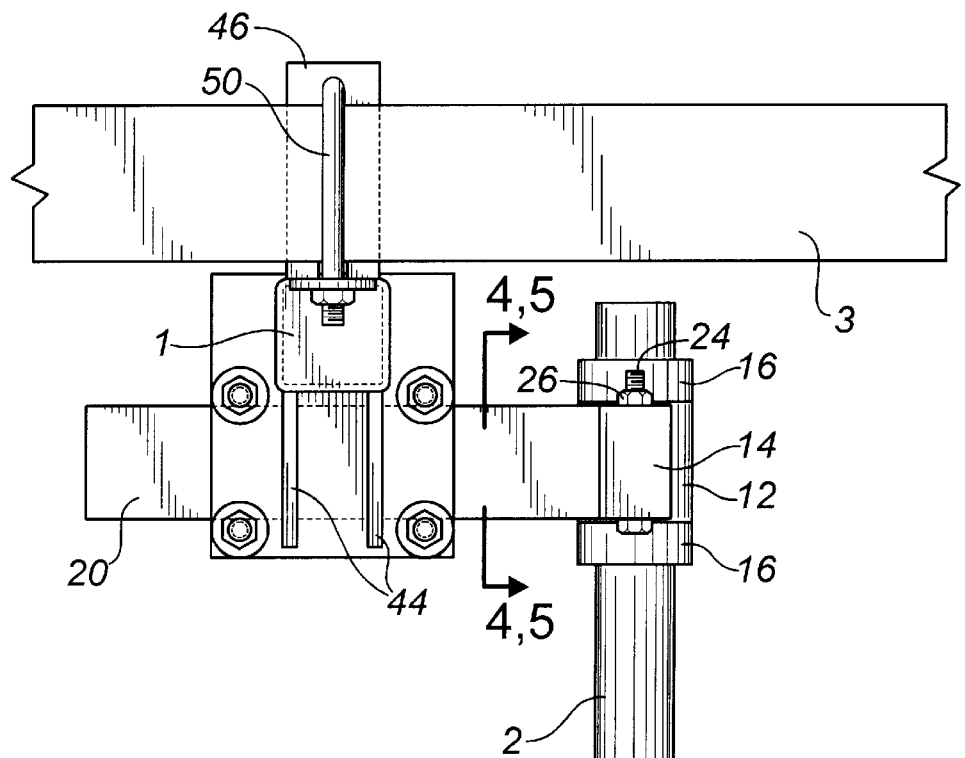
FIG. 3 is a rear elevational view of the assembly shown in FIG. 1.
Figure 3:
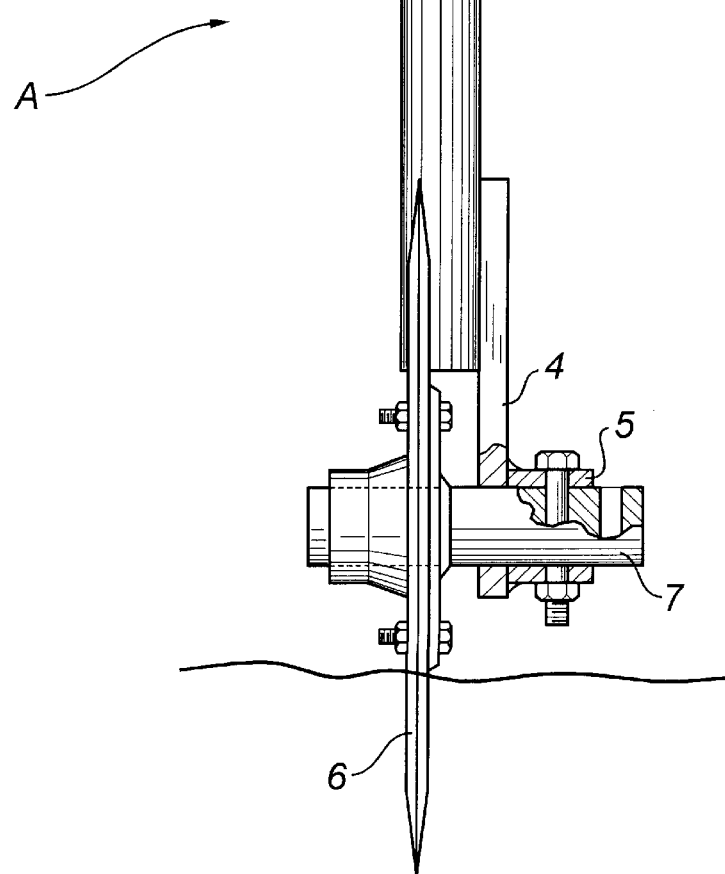

The assembly (A) according to the Figures is comprised of a support beam (1) which supports a vertical strut (2) and which is rigidly attached to a transverse beam (3) which forms part of a cultivator/air seeder (not shown).

The strut (2) supports an arm (4) which includes tubular sleeve (5). The coulter (6) is mounted on a shaft (7). The coulter (6) rotates on the shaft (7) by means of a conventional hub/bearing assembly (not shown).

The arm (4) is preferably permanently affixed to the strut (2) by welding or other suitable means. The strut (2) is held in place by sleeve (12) which is welded to lever (14). The sleeve (12) permits rotation of the strut which facilitates directional changes by the cultivator/air seeder in operation. Vertical movement of the strut (2) within the sleeve (12) is restricted by collars (16) and set screws (18) which releasably attach to the strut (2) on either side of the sleeve (12).

The lever arm (14) is attached to a torsion tube (20) comprising a torsion rod (22). The lever arm (14) defines a circular opening through which one end of a torsion rod (20) is inserted. The torsion rod (22) is rigidly attached to the lever arm by a bolt (24) which passes through the lever arm (14) and the torsion rod (22). The bolt (24) is held in place by a conventional nut (26).

Figure 4:
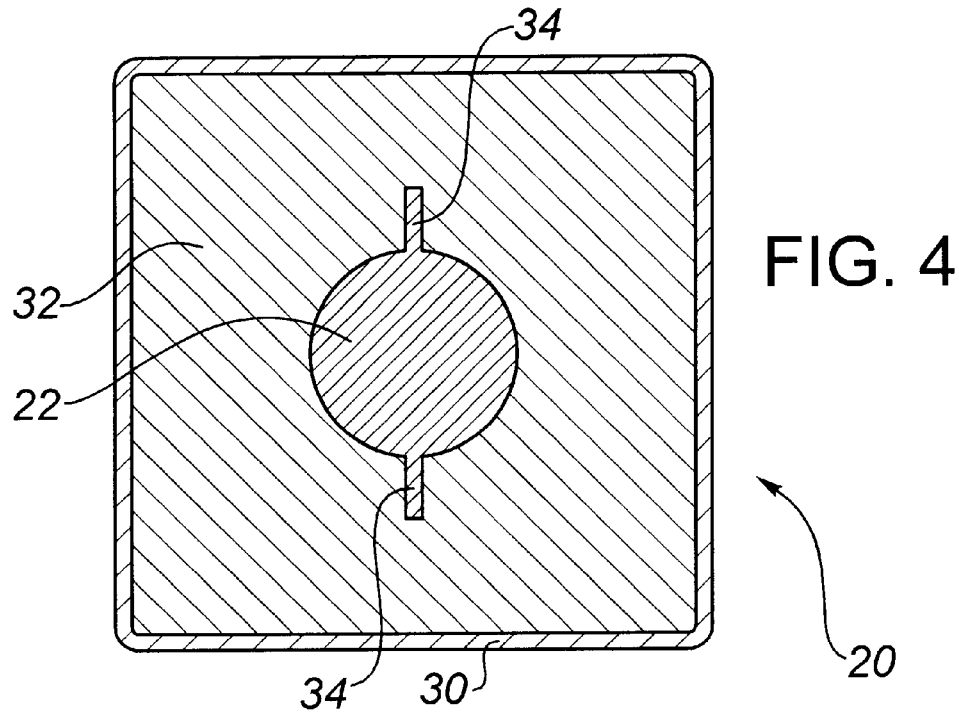
FIG. 4 is a cross-sectional view of a torsion tube of the present invention.

The torsion tube (20) is preferably a rubber-filled tube of the variety exemplified by commercially available FlexRide™ torsion tubes manufactured by U.C.F. America Inc. of Pennsacken, N.J. As shown in FIG. 4, the torsion tube comprises a casing (30) filled with rubber (32) which encases the torsion rod (22). The torsion rod (22) defines projections (34) which ensure that the torsion rod (22) does not twist within the rubber (32). The square cross-sectional shape of the casing (30) ensures that the rubber (32) does not twist within the casing (30).

Figure 5:
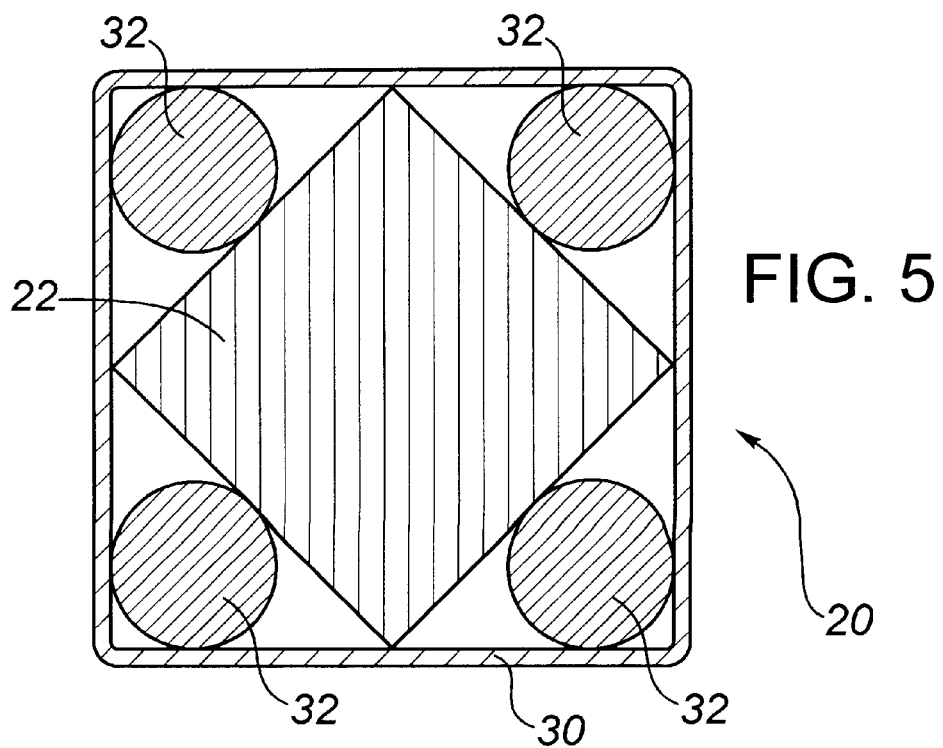
FIG. 5 is a cross-sectional view of an alternative torsion tube.

The torsion tube (20) may assume many different configurations. An alternative commercially available embodiment is shown in FIG. 5. This example is manufactured by Henschen Industries of Jackson Centre, Ohio and is a lighter duty torsion tube (20) than that illustrated in FIG. 4.

The rubber (32) permits the torsion rod (22) to rotate slightly within the torsion tube (20) but resists such rotational movement and urges the torsion rod (22) to its resting position.

The torsion tube (20) is securely affixed to the support beam (1) by any suitable means. As shown in the Figures, the torsion tube may be held by U-shaped mounting bolts (40) and a mounting plate (42) which is welded to the support beam and reinforced by a gusset (44). The support beam (1) may include means to secure itself to the transverse beam (3) of the implement (not shown). The means shown in the preferred embodiment include a L-shaped mounting bracket (46) welded to the support beam (1) and reinforced by gussets (48). The mounting bracket (46) cooperates with an L-shaped bolt (48) which secures the support beam (1) to the transverse beam (3).

The depth to which the coulter (6) opens the ground (B) may readily be adjusted by adjusting the position of the collars (16) on the strut (2). The downward force imparted on the coulter (6) by the assembly (A) may be varied by pre-loading or unloading the torsion tube (20). This may be accomplished by adjusting the angle of the lever arm (14) relative to the torsion rod (22). As may readily be appreciated by those skilled in the art, angling the lever arm (14) downwards may increase the downward force imparted by the torsion tube (20) as it reacts to upward movement of the coulter (6). Conversely, angling the lever arm (14) upwards may decrease the downward force.

As may readily be appreciated, the present invention may be utilized with tubes (not shown) configured and positioned to deliver seed or fertilizer into the soil displaced by the coulter (6). Such tube delivery assemblies are well known in the art.

As will be apparent to those skilled in the art, various modifications, adaptations and variations of the foregoing specific disclosure can be made without departing from the teachings of the present invention. By way of example, persons skilled in the art may readily conceive and implement modifications or substitutions to the torsion means disclosed herein (the rubber-filled torsion tubes described above). A true torsion rod with one end affixed to the support beam and the other end affixed to the lever arm may provide the necessary biasing force. Other deformable elastic materials other than rubber may be suitable for use in the disclosed torsion tubes. Furthermore, the specific means disclosed to connect the components of the present invention to each other and to the transverse beam are not meant to be limiting. Any suitable means of attachment or connection is intended to be within the scope of the appended claims.

The embodiments of the invention in which an exclusive property or privilege is claimed are defined as follows:

1. A coulter mounting assembly for mounting a coulter to an implement, the assembly comprises:
   (a) a torsion tube comprising a torsion rod wherein said torsion tube is rigidly attached to the implement;
   (b) a strut rigidly attached to and depending downwardly from the torsion rod; and
   (c) means for rotatably attaching a coulter wheel to the strut;

wherein the combination of the strut and wheel attachment means may rotate about an axis defined by the torsion rod and which rotational movement is resisted by the torsion tube and wherein said wheel attachment means may rotate about an axis defined by the longitudinal axis of the strut while the implement is in operation such that the directional orientation of the coulter changes upon such rotation.

2. The assembly of claim 1 wherein the strut depends substantially vertically from one end of the torsion rod and the assembly further includes means disposed between the strut and the torsion rod which permits swivelling of the strut along a substantially vertical axis.

3. The assembly of claim 2 wherein the strut is cylindrical and the swivel means comprises a substantially vertical cylindrical sleeve within which the strut is inserted.

4. The assembly of claim 1 wherein the torsion tube comprises a casing having a cavity, a torsion rod within said cavity and biasing means disposed between the casing and the torsion rod for urging the torsion rod to a set position.

5. The assembly of claim 4 wherein said biasing means is an elastic material affixed to the casing within the cavity which encases the torsion rod.

6. The assembly of claim 5 wherein the elastic material is rubber.

* * * * *

UNITED STATES PATENT AND TRADEMARK OFFICE
CERTIFICATE OF CORRECTION

PATENT NO : 6,102,132
DATED : August 15, 2000
INVENTOR(S) : Schimke

It is certified that error appears in the above-identified patent and that said Letters Patent are hereby corrected as shown below:

| Location of Error In Patent | Error Correction |
|---|---|
| Column 1 | Remove the following text from Lines 54, 55, 56 and 57: |
| | "wherein the combination of the strut, arm and wheel attachment means may rotate about an axis defined by the torsion means and which rotational movement is resisted by the torsion means." |

Signed and Sealed this

Eighth Day of May, 2001

Attest:

NICHOLAS P. GODICI

Attesting Officer

Acting Director of the United States Patent and Trademark Office